UNITED STATES PATENT OFFICE.

SUMNER A. GILMAN, OF BOSTON, MASSACHUSETTS.

IMPROVEMENT IN PAINTS FOR SHIPS' BOTTOMS.

Specification forming part of Letters Patent No. 124,204, dated March 5, 1872.

*To whom it may concern:*

Be it known that I, SUMNER A. GILMAN, of Boston, in the county of Suffolk and Commonwealth of Massachusetts, have invented a new and useful Improved Marine Paint; and I hereby declare the following to be a full, clear, and exact description of the same, such as would enable others skilled in the art of painting to make and use the same.

The nature of my invention consists in the production of a paint for the bottoms of ships and vessels by incorporating with a resinous or tarry adhesive fluid a preparation of copper, mercury, or arsenic, so as to make a paint which shall be poisonous and destructive to animal and vegetable life, and shall, therefore, prevent the permanent attachment of barnacles, borers, and seaweed to ship's bottoms when coated with said paint.

I take a quantity of wood-tar, coal-tar, turpentine, resin, pitch, or asphaltum, and reduce the same to a suitable consistency by the admixture of benzine, naphtha, oil of turpentine, or rosin oil. My invention contemplates the use of any resinous or tarry menstruum, but not one or any of an oleaginous character. The mixture should be so thin as to be easily applied with a brush, like ordinary paint. I then add to this fluid about one-third of its weight of some insoluble compound of copper, mercury, or arsenic, such as the sulphide or disulphide or precipitated oxide or sub-oxide of copper, arsenite, arseniate, phosphate, borate, carbonate, basic sulphate or dichloride of copper, or the oxide, chromate, basic sulphate, arseniate, or yellow basic nitrate of mercury, arsenious acid orpiment, or arseniate of lead.

In order to mix the dry mineral substance with the tarry or resinous menstruum with greater ease, I find it advisable to soak or grind said substance beforehand in naphtha, benzine, or oil of turpentine, forming a thin paste which mixes readily with the tarry or resinous menstruum. As the paint so produced may sometimes have the poisonous property in a greater degree than is actually required, I sometimes add to the same more or less of different substances, such as ochre, Venetian-red, umber, whiting, &c. I find that a paint so prepared, when it is applied to ship's bottoms, dries readily to a smooth, hard, and strongly-adhesive coat, which retains for any length of time its poisonous character.

I am aware that some salts of copper, such as blue vitriol and verdigris, have been before used for the same purpose, but these salts have been used in connection with linseed-oil, or other so-called drying oils. Such drying oils greatly impair the poisonous property of copper salts, and the paint made therewith is not sufficiently noxious to prevent the adhesion of barnacles and other animate growths, while a tarry or resinous menstruum does not diminish the activity of the metallic poison. I am aware, also, that metallic copper, reduced to powder by precipitation, and burnt copper or copper scales; also the sulphuret of copper reduced to powder by grinding; have been used in a similar way; but these substances are exceedingly dense, and cannot, by any practicable amount of grinding, be kept uniformly suspended in a paint. Moreover, the density and compactness of the particles is such that their efficacy as poisons in the paint is very slight, as compared with the impalpably-fine chemical compounds of copper produced by precipitation.

It will be readily understood that one cause of the efficacy of the poison is its presence throughout the whole mass or body of the paint, and, when applied in the form of a precipitate, it is more easily mixed, and kept universally diffused or suspended throughout the whole compound.

In the case of the burnt copper or copper scales and sulphuret of copper reduced to powder by grinding, the paint presents merely separate particles of the poison scattered throughout the menstruum, but not diffused and assimilated by reason of the fineness of the particles throughout the whole body of the paint. Furthermore, the condition in which I introduce the copper into the paint renders it much more prompt in its action on animal or vegetable growths.

I do not claim the simple use of any of the preparations of copper irrespective of their mode of production.

I disclaim the use of copper, or oxide of copper, made from the pyritous friable ores, in order to be more easily reduced to a fine powder, as set forth in the reissues, divisions A and B, dated October 17, 1871, granted to James G. Tarr and A. H. Wonson; neither do I claim the "copper scale" specified as preferable in division A of said reissue. These patents specify that the metallic copper is to be "finely pulverized." As before specified I use the precipitated copper.

What I claim as my invention, and desire to secure by Letters Patent, is—

1. The paint herein described, consisting of a tarry or resinous menstruum mixed with oxides, sulphides, or the insoluble salts, or basic salt of copper produced by precipitation.

2. The use or application of the precipitated oxides, sulphides, insoluble salts, or basic salt of copper, either with or without an admixture of ochre, umber, chalk, or other dilutent substances in marine paint, for the purposes set forth.

3. The combination, with a tarry or resinous menstruum, of the oxide or insoluble salts of mercury or an insoluble preparation of arsenic, for instance, orpiment, as herein set forth, to be used as a marine paint.

SUMNER A. GILMAN.

Witnesses:
WM. HENRY CLIFFORD,
D. W. SCRIBNER.